(12) United States Patent
Fünfgeld et al.

(10) Patent No.: US 9,546,698 B2
(45) Date of Patent: Jan. 17, 2017

(54) DUAL CLUTCH

(71) Applicant: SCHAEFFLER TECHNOLOGIES GMBH & CO. KG, Herzogenaurach (DE)

(72) Inventors: Simon Sebastian Fünfgeld, Karlsruhe (DE); Patrick Weydmann, Bühl (DE); Gerhard Gander, Bühlertal (DE); Alexander Obitz, Bühl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/418,347

(22) PCT Filed: Aug. 1, 2013

(86) PCT No.: PCT/DE2013/200089
§ 371 (c)(1),
(2) Date: Jan. 29, 2015

(87) PCT Pub. No.: WO2014/019584
PCT Pub. Date: Feb. 6, 2014

(65) Prior Publication Data
US 2015/0159706 A1 Jun. 11, 2015

(30) Foreign Application Priority Data

Aug. 3, 2012 (DE) ........................ 10 2012 213 801

(51) Int. Cl.
*F16D 21/02* (2006.01)
*F16D 13/58* (2006.01)
*F16D 21/06* (2006.01)

(52) U.S. Cl.
CPC ........... *F16D 13/585* (2013.01); *F16D 13/583* (2013.01); *F16D 21/06* (2013.01)

(58) Field of Classification Search
CPC ............................ F16D 13/583; F16D 13/585
See application file for complete search history.

(56) References Cited

U.S. PATENT DOCUMENTS

| | | | |
|---|---|---|---|
| 5,088,583 A * | 2/1992 | Takeuchi | F16D 13/585 192/70.27 |
| 6,085,882 A * | 7/2000 | Kimmig | F16D 13/71 192/109 A |

(Continued)

FOREIGN PATENT DOCUMENTS

| | | |
|---|---|---|
| DE | 102004018377 A1 | 11/2004 |
| DE | 10340665 A1 | 3/2005 |

(Continued)

OTHER PUBLICATIONS

Chinese Office Action, Jun. 3, 2016.

*Primary Examiner* — Robert Hodge
*Assistant Examiner* — Ryan Dodd
(74) *Attorney, Agent, or Firm* — Lucas & Mercanti, LLP

(57) ABSTRACT

A dual clutch for coupling an engine drive shaft with a transmission shaft and/or an auxiliary power take-off. A first friction clutch presses a first clutch plate that is couplable with the transmission shaft between a first contact plate, displaceable in an axial direction to engage the first friction clutch and a first counter plate. A second friction clutch presses a second clutch plate that is couplable with the auxiliary power take-off between a second contact plate, displaceable in the axial direction to engage the second friction clutch and a second counter plate. First and second actuating elements move the first and second contact plates; respectively. The second contact plate is connected to a thrust ring connected to the second actuating element to transfer displacing movement. The second actuating element has a spring element, situated between the second actuating element and the thrust ring, for pre-stressing so that a (Continued)

reduction of contact force is avoided in case of wear and tolerance dependency of the contact force and/or actuating force is decreased.

6 Claims, 6 Drawing Sheets

(56) References Cited

U.S. PATENT DOCUMENTS

| | | | |
|---|---|---|---|
| 6,260,684 B1 * | 7/2001 | Lebas | F16D 13/585 |
| | | | 192/109 A |
| 7,066,313 B2 | 6/2006 | Kimmig et al. | |
| 2002/0179398 A1 * | 12/2002 | Mokdad | F16D 13/583 |
| | | | 192/70.27 |
| 2012/0255826 A1 * | 10/2012 | Tanaka | F16D 13/585 |
| | | | 192/48.1 |

FOREIGN PATENT DOCUMENTS

| | | | | |
|---|---|---|---|---|
| DE | 102011101555 A1 | | 12/2011 | |
| FR | 2060836 | * | 5/1971 | ............... F16D 3/00 |
| FR | 2694967 A1 | | 2/1994 | |
| FR | 2860845 | * | 4/2005 | ............. F16D 13/58 |
| FR | 2860845 A1 | | 4/2005 | |
| GB | 2269866 A | | 2/1994 | |
| JP | 2011137486 | * | 7/2011 | ............. F16D 13/46 |

* cited by examiner

DUAL CLUTCH

The present application is a 371 of International application PCT/DE2013/200089, filed Aug. 1, 2013, which claims priority of DE 10 2012 213 801.3, filed Aug. 3, 2012, the priority of these applications is hereby claimed and these applications are incorporated herein by reference.

BACKGROUND OF THE INVENTION

The invention relates to a dual clutch for coupling a drive shaft of a motor vehicle engine with a transmission shaft of a motor vehicle transmission and/or an auxiliary drive of the motor vehicle. Clutch units of this sort are used, for example, in tractors or other utility machines for agriculture. In such cases, a first friction clutch is used for driving operation, and a second friction clutch for independent engagement and disengagement of an additional auxiliary power take-off by means of which its additional units are drivable. The second friction clutch is usually open in a non-engaged state, for example when starting the motor vehicle engine, and in an engaged state can draw the required power directly from the drive shaft. Because of the independent actuation of the friction clutch, the auxiliary drive may be employed while standing still or also when the motor vehicle is moving. Using the second friction clutch, for example mowing machines and other agricultural attachments, such as mechanical or hydraulic winches, hydraulic pumps or compressors may be driven, which in contrast to electrical equipment offer significantly more power and do not burden an on-board electrical system of the motor vehicle. However, these dual clutches usually have a great tolerance dependency of the contact force and the engaging forces, as well as tension-critical loading of the actuating system, in particular of the second friction clutch when being engaged.

SUMMARY OF THE INVENTION

The object of the invention is therefore to prepare a dual clutch that enables the tolerance dependency of contact force and engaging force to be lowered, and enables a reduction of the tensions in the actuating system.

According to the invention, a dual clutch for coupling a drive shaft of a motor vehicle engine with a transmission shaft of a motor vehicle transmission and/or an auxiliary power take-off of the motor vehicle, in particular a power take-off shaft, is provided, having a first friction clutch for frictionally pressing a first clutch plate that is couplable with the transmission shaft between a first contact plate and a first counter plate, where the first contact plate is displaceable in an axial direction to engage the first friction clutch, a second friction clutch for frictionally pressing a second clutch plate that is couplable with the auxiliary power take-off between a second contact plate and a second counter plate, where the second contact plate is displaceable in the axial direction to engage the second friction clutch, a first actuating element to move the first contact plate, a second actuating element to move the second contact plate, the second contact plate being connected to a thrust ring which is operationally connected to the second actuating element to transmit the displacing movement. According to the invention, the second actuating element has at least one spring element for pre-stressing; the at least one spring element being situated between the second actuating element and the thrust ring.

The first clutch plate may be connected to the transmission shaft non-rotatingly but axially movably through toothing; the second clutch plate may be connected to the auxiliary drive non-rotatingly but axially movably through toothing. The particular clutch plate of the associated friction clutch may have a friction lining, in particular on each of the axial faces which face away from each other, which may come into frictionally engaged contact with a possibly provided friction lining of the associated counter plate and/or contact plate in order to engage the particular friction clutch. The dual clutch, in particular the first friction clutch of the dual clutch, may have a vibration damper. A dual-mass flywheel and/or a centrifugal force pendulum and/or a mass pendulum, for example, may be used as the vibration damper, which may be situated, for example, on the first clutch plate. The dual clutch may have an independently operable first friction clutch in the form of a sheet metal cover single clutch, in order to produce a frictional lock between the motor vehicle, engine, in particular the drive shaft of the motor vehicle engine, and the transmission shaft, to propel the motor vehicle. The second friction clutch may be situated in the form of an auxiliary power take-off clutch as an understructure on the first friction clutch, for example between the first friction clutch and a flywheel of the motor vehicle engine. The auxiliary power take-off clutch, for example a power take-off shaft of a tractor, may be designed as a safety power take-off shaft clutch, where in the event of an error in the engaging mechanism, in particular the second actuating element, the auxiliary power take-off clutch immediately disengages and the uncoupled auxiliary power take-off is able to come to a stop. The auxiliary power take-off may be designed in the form of a directly driven engine power take-off shaft, which is directly connectable to the motor vehicle engine through the second friction clutch, and thus may be operated at the rotational speed of the motor vehicle engine, independent of any movement of the motor vehicle. Auxiliary power take-off clutches are usually referred to by the abbreviation of the English term power take-off as PTOs, while a safety auxiliary power take-off clutch or safety clutch, may be referred to as a safety PTO.

The first friction clutch is operable by an at least partially axial movement of the first actuating elements, where the first contact plate may be moved in the axial direction toward the first counter-pressure plate, while through frictionally pressing the first clutch plate between the first contact plate and the first counter plate a frictional lock may be produced between the motor vehicle engine and the transmission shaft in order to propel the motor vehicle. The first actuating element may be designed, for example, in the form of a first lever spring, which is operable independently of a second actuating element. Independent of the first friction clutch, the second friction clutch is engageable by means of the second actuating element and a thrust ring, in order to produce a frictional lock between the motor vehicle engine and the auxiliary power take-off, for example a power take-off shaft.

In this case, the second actuating element has at least one additional spring element, the spring element being situated pre-tensioned in an assembled state on the second actuating element and being situated between the second actuating element and the thrust ring. In an assembled state, the at least one spring element, preferably a plurality of spring elements, act like a pre-tensioned pressure three accumulator which is situated between the second actuating element and the thrust ring, while a movement of the second actuating element is transferable through the at least one spring element to the thrust ring, whereby a movement of the thrust ring may be achieved. The thrust ring may be of pot-like or pot-shaped design and may externally surround the first friction clutch, which may be situated inside a clutch cover, while the clutch cover may be at least partially surrounded by the thrust ring. The thrust ring is connected in this case to the second contact plate of the second friction clutch. The second clutch may be disengaged in a non-activated state. The engagement of the thrust ring, and thus of the second contact plate, takes place through actuation of the second actuating element, which may be situated on the face of the clutch cover of the first friction clutch, on a side facing away from the first and the second contact plates. The second actuating element may be mounted movably, preferably tiltably, by means of bolts attached to the clutch cover of the first friction clutch and a wire support ring positioned on the bolt. The wire support ring may be tightened radially around the outside of the bolts, while the second actuating element in the form of a second lever spring contacts the wire support ring and/or the bolts in such a way that the lever spring is mounted tiltably on the wire support ring and/or the bolt, in particular when the second actuating element is actuated.

The at least one spring element may be designed and situated on the second actuating element in such a way that, in an assembled state, in particular due to an elastic deformation of the spring element, a pre-stressing force may be caused in the spring element, while the pre-stressing force may counteract a displacement during an engagement and actuation of the second actuating element. Preferably, the pre-stressing force of the spring element may act in an axial direction, in particular in an axial direction facing away from the second contact plate. An engaging force to actuate the second friction clutch, which may act radially on the inside of the second actuating element, is able, due to the spacing at intervals of the support and/or contacting of the second actuating element on the wire support ring as well as the support of the spring element on the thrust ring, to bring about a transmission of the engaging force that is transferred to the thrust ring.

While engaging as a result of an engaging force, the second actuating element with the at least one spring element, preferably the group of the second actuating element with the at least one spring element, initially has high rigidity, until the translated engaging force exceeds the pre-stressing force caused by the spring element. Until the pre-stressing force is exceeded, at least one spring element is able to preserve its position, and in essence its form. When the pre-stressing force is exceeded, the at least one pre-stressed spring element may be further deformed elastically, for example straightened, so that upon further engagement of the second actuating element a deformation occurs essentially in the at least one spring element, whereby the contact force transferred through the at least one spring element to the thrust ring, and thus to the second contact plate, is able to run out in a flat force characteristic curve after the pre-stressing has been surpassed. By means of the at least one pre-stressed spring element of the second actuating element, two rigidities of differing values may be integrated in the second actuating element. As a result, the contact force, corresponding to the chosen rigidities, may have two regions with different progressions of the force characteristic, for example in the form of an angular characteristic progression, with an essentially linear, steeper rise of the contact force in a first section and an essentially linear, flatter-progressing second section. This makes it possible to ensure in the second region a flatter progression of the characteristic of the contact force over the engagement distance that is relevant in operation, both in a new state and in a worn state of the second friction clutch. Thus a reduction of the contact force can be avoided in the event of wear, and the tolerance dependency of the contact force and/or engaging force can be decreased. Through the integration of two rigidities into the pre-stressed second actuating element, with little construction space and little use of materials, an initially high rigidity when engaging may be combined with a lesser rigidity in the engaged state, which enables the stresses in the actuating system when the second friction clutch is actuated to be reduced.

In a preferred embodiment, the second actuating element is a lever spring with lever spring tongues directed radially inward, there being at least one spring element situated on a lever spring tongue. On the lever spring, in particular the lever spring tongues, a plurality of spring elements, preferably in each case at least one, may be situated. Preferably, each of the lever spring tongues of the lever spring has a separate spring element. The spring elements may be situated, pre-stressed, on an underside of the lever spring tongue facing the thrust ring. The spring elements may be elastically deformed in the assembled state, whereby a pre-stressing force in an axial direction, preferably directed away from the thrust ring, may be produced.

During the engaging as a result of the engaging force, the translated engaging force may initially be less than the pre-tensioning of the spring elements, which enables the spring elements to retain their position and substantially their form. In this position, the lever spring together with the at least one spring element is able to have a high rigidity. If the translated engaging force continues to rise, the at least one spring element may be further elastically deformed, for example straightened. After the pre-stressing force has been surpassed, the at least one spring element may have little rigidity, so that even in the worn state of the second clutch an essentially constant contact force level can be maintained.

By particular preference, the lever spring tongues have an arched curvature. The arch may be formed in the area of the installed spring elements in the lever spring tongues, preferably every lever spring tongue. The arch may be formed away from the thrust ring and the spring element, while the arch may be bow-shaped. As a result, the spring element may be at least partially spaced apart from the lever spring tongue on the lever spring. Due to the curvature, in the pre-stressed state the spring element may fit closely against the lever spring tongue and in contact with it in a radially inner region and a radially outer region of the lever spring tongue, for example radially inside and outside of the arch. Due to the curvature in the lever spring tongue, when the spring element is bent space may be made available for axial movement of the spring element as the second friction clutch is engaged, whereby the required construction space may be reduced.

In a preferred embodiment, at least one fastening element is provided for fastening a spring element to a lever spring tongue. Each spring element can be fastened, pre-stressed, to a lever spring tongue by at least one fastening element in each case. The at least one fastening element may be situated in the area of the arch and/or radially inward and/or outward from the arch. The fastening element may be designed in the form of a materially bonded, frictional and/or form-locked connection. Preferably, the at least one fastening element makes a separable attachment of the spring element to the lever spring tongue possible, whereby greater variability in the adjustability of the rigidity may made possible, for example by exchanging one or more spring elements.

In an especially preferred embodiment, the fastening element is designed in the form of a clip connection with at least two holding clips. By means of the clip connection, a disconnectable attachment of the spring element to the lever spring tongues can be enabled. The at least two holding clips may be hook-shaped, and essentially centered on the longitudinal sides of the spring element. By means of the holding clips, the pre-stressed spring element can be fastened to the lever spring tongues in an assembled state, using a pre-stressing force. By means of the holding clips, the spring element can be fixed in the circumferential direction on the lever spring tongue, whereby the spring element can be positioned and secured for example against slipping sideways, in particular during engagement.

Preferably, the spring element has a cutout to rest on a bulge of the thrust ring. The cutout may be designed in the form of a groove situated transversely to the longitudinal extent of the spring element. The cutout may be essentially matched to the shape of the ring-shaped bulge formed on the face of the thrust ring. Due to the resting of the cutout on the bulge in an assembled state, a positioning of the spring element in the radial direction and a securing against displacement, in particular during engagement of the second clutch, can be guaranteed.

The invention also relates to a gear train for a motor vehicle, having at least one dual clutch, which may be designed and refined as described above, for coupling a drive shaft of a motor vehicle engine to a transmission shaft of a motor vehicle transmission and/or an auxiliary power take-off of the motor vehicle. By that means a reduction in the contact force can be avoided in the event of wear, and the tolerance dependency of the contact force and/or actuating force can be decreased.

The invention is explained below by way of example with reference to the accompanying drawings, on the basis of preferred exemplary embodiments; the features depicted below can each depict an aspect of the invention, both individually and in combination.

BRIEF DESCRIPTION OF THE DRAWING

The figures show the following:

FIG. 4b: a sectional view of the pre-stressed second actuating element from FIG. 4a;

DETAILED DESCRIPTION OF THE INVENTION

Figure 1:
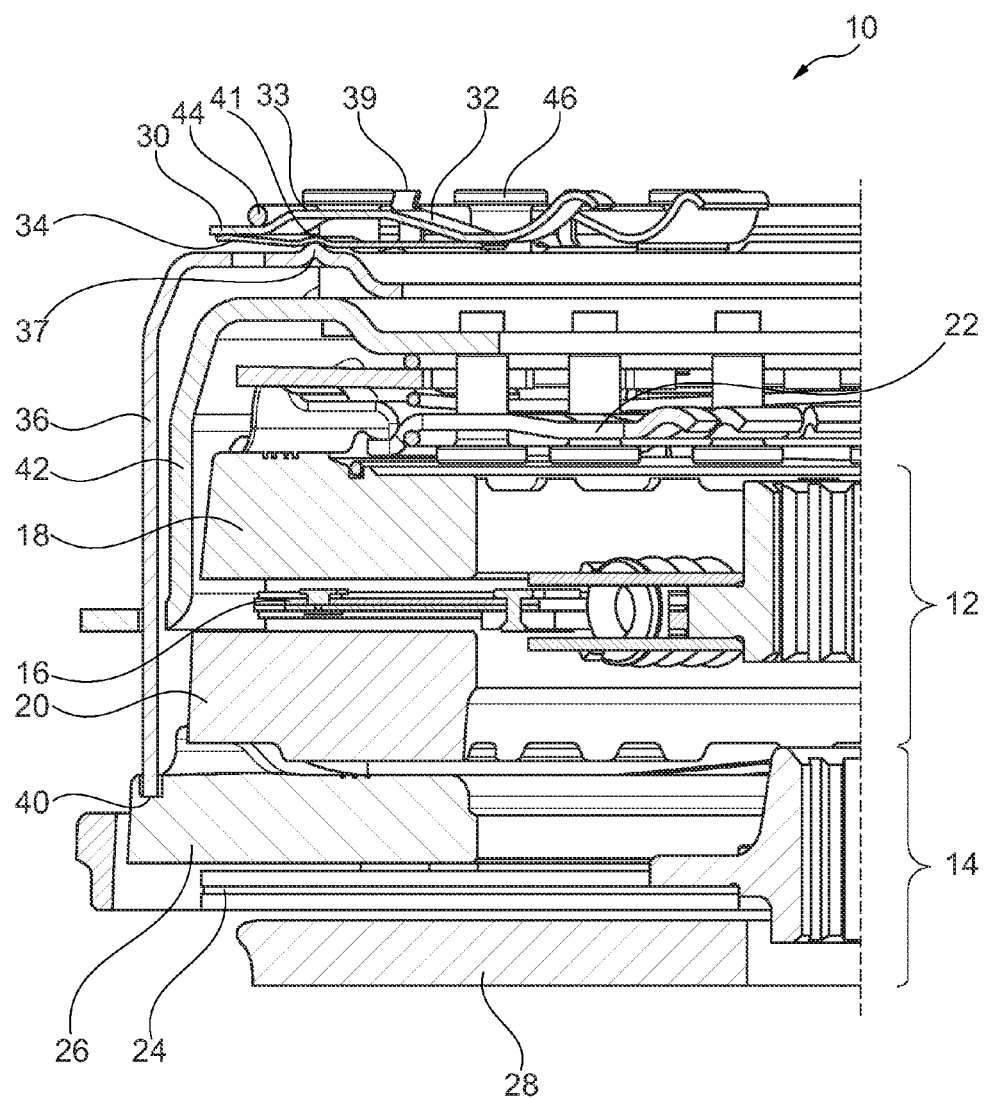
FIG. 1: a schematic sectional view of a dual clutch according to the invention.

FIG. 1 depicts a dual clutch 10 with a first friction clutch 12 and a second friction clutch 14, the first friction clutch 12 and the second friction clutch 14 being depicted in a non-engaged state. The first friction clutch 12 is designed as a sheet metal cover single clutch with a first clutch plate 16 to be frictionally clamped between a first contact plate 18 and a first counter plate 20, where the first contact plate 18 is movable in an axial direction by actuating a first actuating element 22 in the form of a first lever spring. Underlying the first friction clutch 12 is the second friction clutch 14 in the form of a safety auxiliary power take-off clutch with a second clutch plate 24 to be clamped between a second contact plate 26 and a second counter plate 28, where the second contact plate 26 is movable in an axial direction independent of the first friction clutch 12 when a second actuating element 30 is actuated. The second friction clutch 14 is depicted in a non-actuated, disengaged state. The second actuating element 30 is designed in the form of a second lever spring with lever spring tongues 32 extending radially inward. The second actuating element 30 has a plurality of axially pre-stressed spring elements 34, there being a spring element 34 situated on the contact plate side of every lever spring tongue 32 of the lever spring. The lever spring tongues 32 each have an arch 33 formed essentially in the center, which is formed away from the second contact plate 26 and the spring element 34. The spring elements 34 are each situated in the area of the arch 33 in such a way that the spring elements 34 contact the respective lever spring 32 in a bowlike or bridge-like manner, radially inside and radially outside of the arch 33. The transmission of an engaging motion during actuation of the second actuating element 30 in the form of the second lever spring pre-stressed by the spring elements 34 takes place through a thrust ring 36 onto the second contact plate 26, which is connected to the thrust ring 36, where the spring elements 34 of the second actuating element 30 contact the thrust ring 36 to transmit the engaging motion. The thrust ring 36 is secured against release by a threaded connection 38 in the radial direction with the second contact plate 26, the thrust ring 36 being received in a groove 40 in the second contact plate 26. The groove 40 is formed radially outside in a surface of the second contact plate 26 facing away from the second clutch plate 24.

The thrust ring 36 encircles the first friction clutch 12 essentially on the outside, the thrust ring 36 at least partially penetrating a clutch cover 42 of the first friction clutch 12, whereby passage of the thrust ring through the clutch cover 42 of the first friction clutch 12 can be guaranteed. On the face of the pot-like or pot-shaped thrust ring 36, on a face turned toward the second actuating element 30, a ring-shaped encircling bulge 37 is formed, which contacts the spring elements 34 of the pre-stressed second actuating element 30. The bulge 37 contacts the spring elements 34 of the second actuating element 30 radially on the inside, which is tiltably supported radially on the outside of the contact point of the spring elements 34 with the bulge 37, on a wire support ring 44. The wire support ring 44 is situated radially outside around a plurality of bolts 46, which are connected to the clutch cover 42 of the first friction clutch 12. By means of the distance between the wire support ring 44 and the bulge 37, as well as the point of introduction of the engaging force located radially on the inside, transmission of the engaging force acting on the thrust ring 36 can be enabled. The spring elements 34 are each fastened to the lever spring tongues 32 by means of a fastening element 35 in the form of a clip connection with two hook-shaped holding clips 39, the holding clips 39 being formed essentially centered and laterally on the spring elements 34. The spring elements 34 have a cutout 41 to rest on the bulge 37, which is matched to the shape of the bulge 37.

Figure 2:
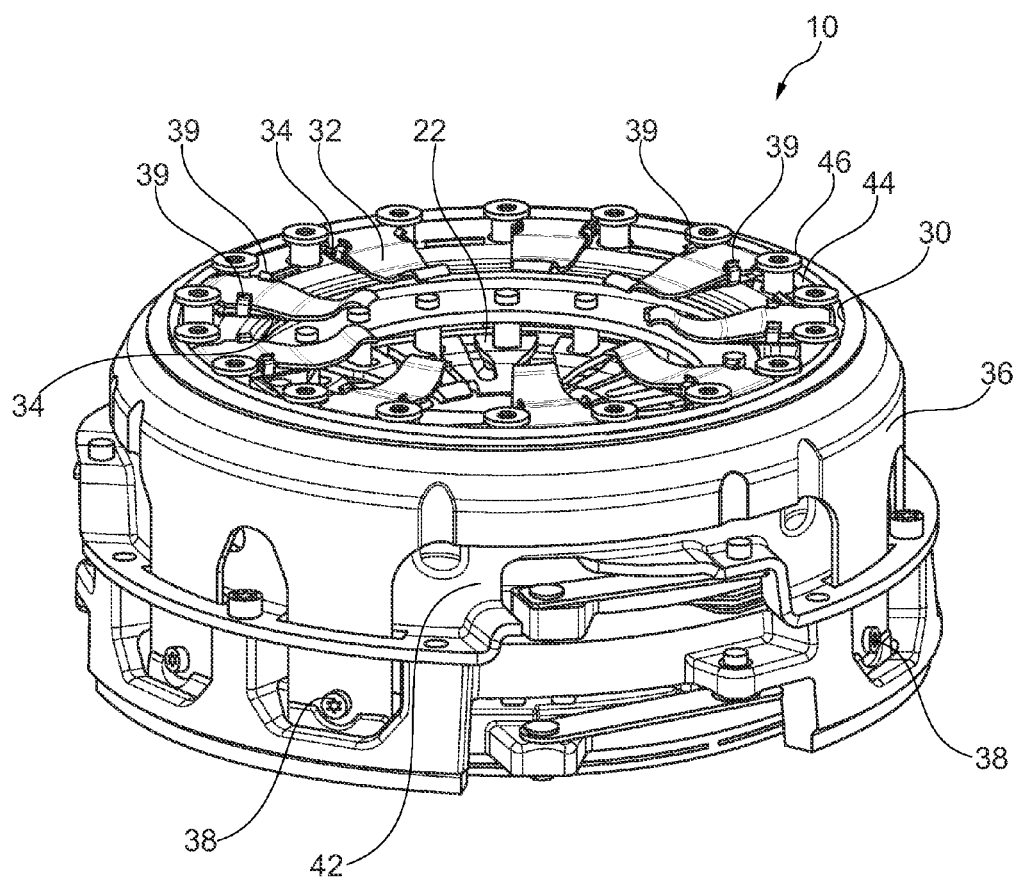
FIG. 2: a general view of a dual clutch according to the invention.

FIG. 2 depicts the dual clutch 10 in an assembled state, the lever spring tongues 32 with the spring elements 34 of the pre-stressed second actuating element 30 assembled pre-stressed thereon being depicted in a non-actuated state. The spring elements 34 contact the bulge 37 of the thrust ring 36. The second actuating element 30 fits closely against, the thrust ring 36 radially on the outside. The thrust ring 36 protrudes at several places through the clutch cover 42 of the first friction clutch 12, and is detachably connected to the second contact plate 26 of the second friction clutch 14 by radial threaded connections 38.

Figure 3:
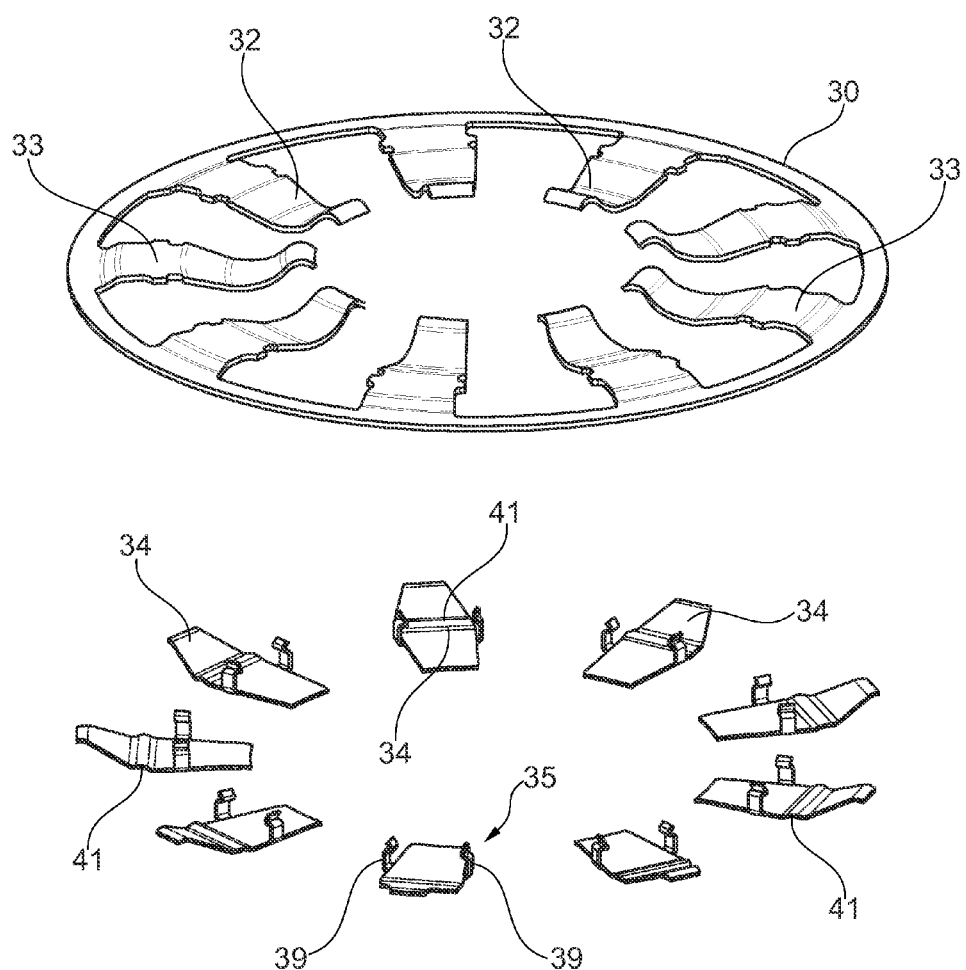
FIG. 3: a second actuating element with spring elements.

FIG. 3 depicts the second actuating element 30 in an unassembled state in the form of a lever spring with lever spring tongues 32, and spring elements 34 spaced at a distance from them with fastening elements 35 in the form of hook-shaped holding clips 39. The second actuating element 30 has nine lever spring tongues 32 arranged radially inside and nine spring elements 34. The lever spring tongues 34 each have an arch 33. The spring elements 34 have a cutout 41 to rest on the bulge of the thrust ring (not shown), which is formed transversely to the longitudinal extension of the spring elements 34. The cutouts may be formed arcuately, transversely in the spring elements 34, in order to be able to rest against the ring-shaped bulge without a gap. The fastening elements 35 are designed in the form of clip connections, each having two hook-shaped holding clips 39 situated centered and laterally on the spring elements 34.

Figure 4A:
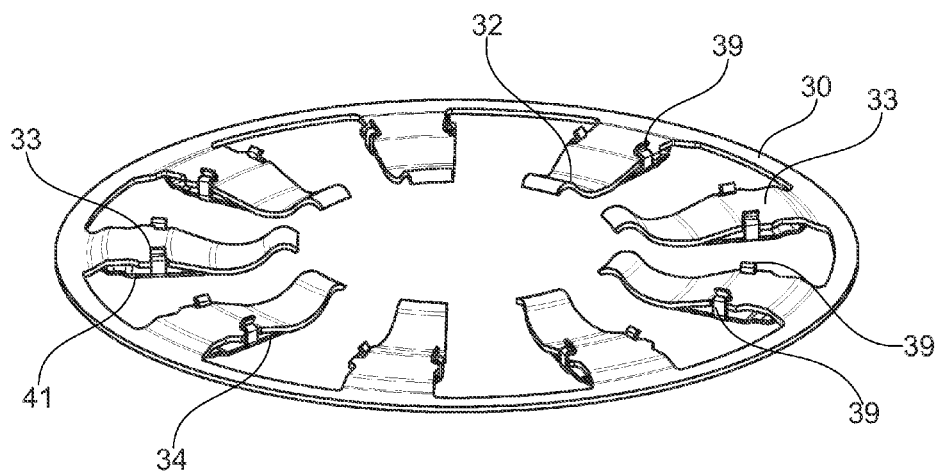
FIG. 4a: the second actuating element from FIG. 3 with assembled spring elements.
Figure 4B:
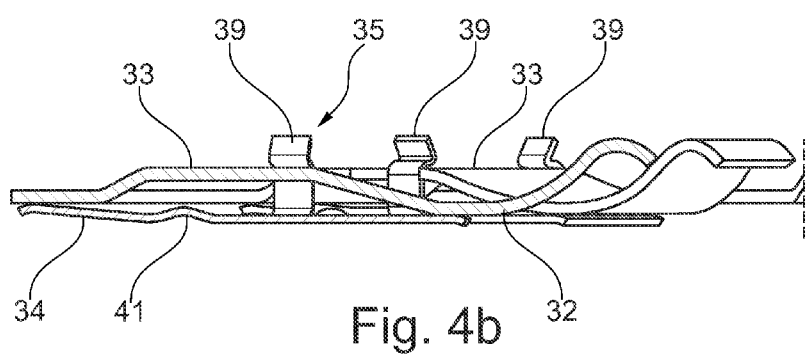

FIG. 4a depicts the second actuating element 30 in an assembled state with the spring elements 34 fastened to the lever spring tongues 32. The second fastening element 30 is pre-stressed in the axial direction by the spring elements 34, which are fastened pre-stressed to the lever spring tongues 32 using the fastening elements 35. A sectional view along the line A-A of a lever spring tongue 32 with a spring element 34 situated thereon is depicted in FIG. 4b. The spring element 34 is held pre-stressed on the lever spring tongue 32 by the holding clips 39 in the area of the arch 33.

Figure 5:
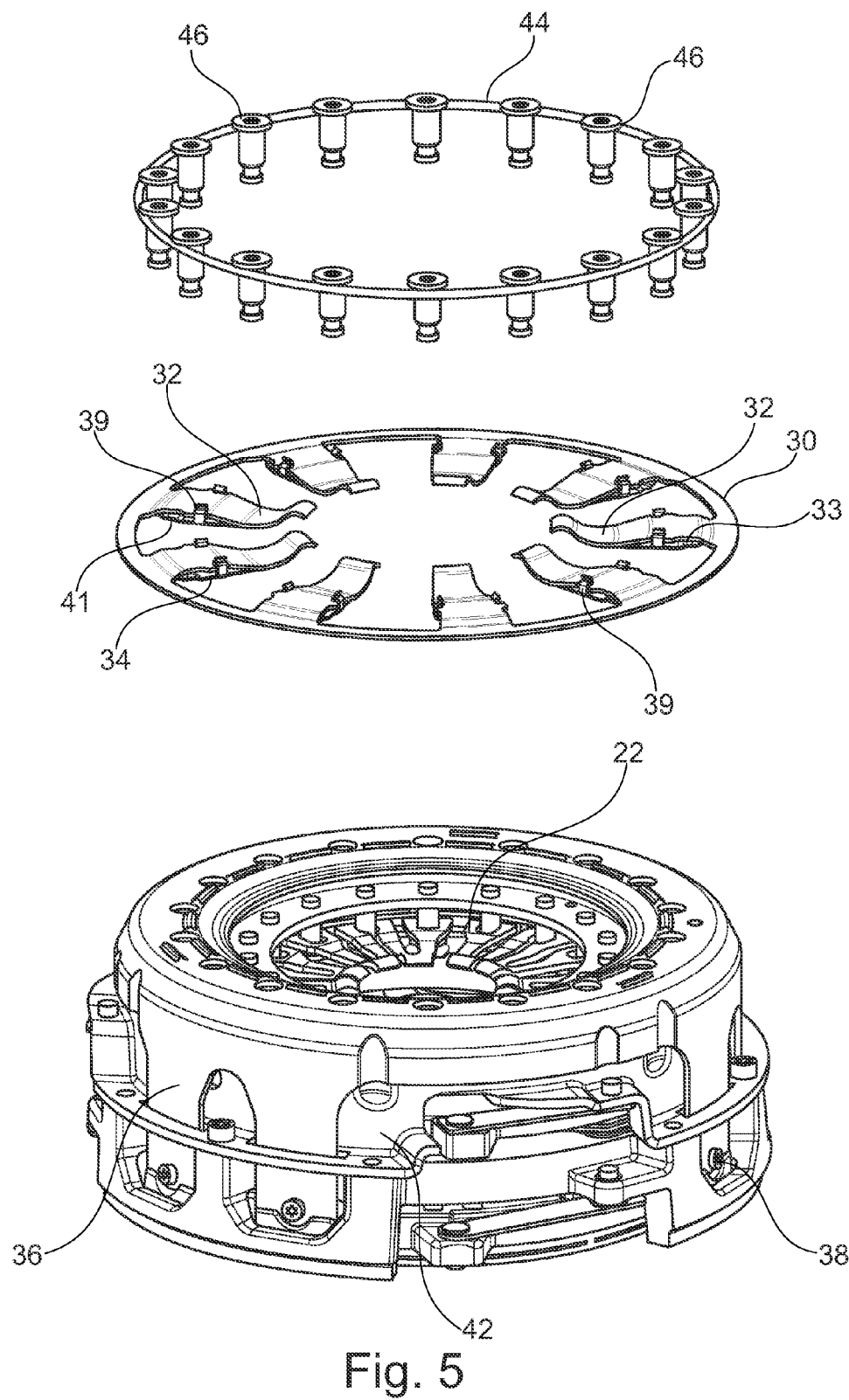
FIG. 5: a thrust ring with a pre-assembled second actuating element and bolts with a wire support ring.

FIG. 5 depicts the thrust ring 36 with the rest of the dual clutch 10, and a second actuating element 30 preassembled at an interval and pre-stressed. Shown spaced apart from the thrust ring 36 and the pre-stressed second actuating element 30 with the spring elements 34 assembled on the lever spring tongues 32 is the wire support ring 44 with the necessary bolts 46 for fastening to the clutch cover 42 of the first friction clutch 12.

Figure 6:
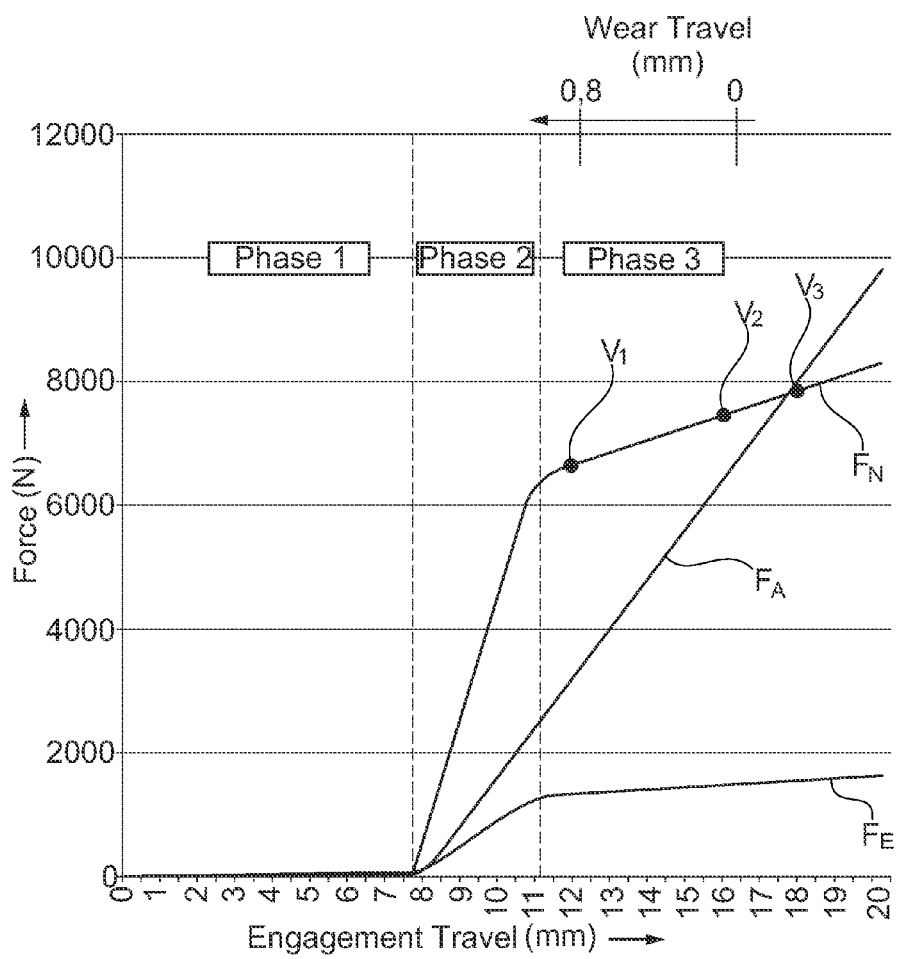
FIG. 6: a diagram to depict the force characteristic curves of a contact force and of an engaging force.

FIG. 6 depicts a diagram to show the contact force $F_N$ of the second friction clutch 14 of the dual clutch 10 according to the invention in comparison to a contact force $F_A$ of a conventional dual clutch, as well as the engaging force $F_E$ which is needed to engage the second friction clutch 14. The engaging process of the second friction clutch 14 can be depicted in three phases. In the first phase the engaging force $F_E$ acts radially inside on the pre-stressed second actuating element 30 with the spring elements 34, in particular on the lever spring tongues 32 with the spring elements 34 assembled pre-stressed thereon. In the first phase, the free play between the second contact plate 26 and the second clutch plate 24 is first surmounted by the displacement of the second contact plate 26; the free play may amounts, for example, to 1.3 mm. Because of the free play no contact force $F_{N,A}$ is produced in the first phase, and the pre-stressed second actuating element 30 tilts radially outside around the wire contact ring 44, its pivot point. With the surpassing of the free play between the second contact plate 26 and the second clutch plate 24 the second phase of the engagement process begins, in which the second contact plate 26 presses the second clutch plate 24 against the second counter plate 28, where the second counter plate 28 may be designed, for example, in the form of a flywheel. Because of the design, in particular the rigidities, of the pre-stressed second actuating element 30, in particular of the lever spring tongues 32 with the spring elements 34 assembled pre-stressed thereon, the engagement force $F_E$ acting on the thrust ring is transmitted. As long as the engaging force $F_E$ is less than the pre-stressing force of the pre-stressed second actuating element 30, the spring elements 34 remain in position on the lever spring tongues 32 and can remain essentially unshaped, while the group of lever spring tongues 32 and spring elements 34 possesses high rigidity. As a result, a steep, essentially linear rise of the contact force $F_N$ can be enabled in the second phase.

The third phase of the engaging process begins essentially upon surpassing the pre-stressing force, in particular of the spring elements 34, of the pre-stressed second actuating element 30, by the engaging force $F_E$, whereby with increasing engagement the spring elements 34 can be further deformed elastically, for example straightened. In this case, the elastic deformation takes place essentially in the spring elements 34, due to the lower rigidity. Due to the integration of two rigidities into the pre-stressed second actuating element 30, in particular into the lever spring tongues 32 with the spring elements 34 fastened to them pre-stressed, during the engagement an initially high rigidity can be combined with a lower rigidity in the engaged state. As a result, in comparison to the second phase, in the third phase the engagement zone which is relevant for operation, a lower linear increase of the contact force $F_N$ can be enabled while the engagement travel increases. The curve of the contact force $F_N$ flattens out significantly at the transition from the second to the third phase because of the two different integrated rigidities. The engagement travel which is relevant during the reliable operation of the second friction clutch 14 is made up of the difference in travel between the maximum and minimum engagement travel $V_3$ to $V_2$, and the wear that occurs, $V_2$ to $V_1$, where at $V_2$ there is no wear and at $V_1$ the maximum wear of, for example 0.8 mm, is present. Over the relevant engagement distance in the third phase a contact force $F_N$ with a very slight linear rise can be guaranteed. After an essentially linear rise in the second phase, the engaging force $F_E$ needed to actuate the second friction clutch 14 has in the third phase, over the relevant engagement path from $V_3$ through $V_2$ to $V_1$ essentially a very slight rise, which is virtually constant. In comparison to the contact force $F_N$ of a dual clutch 10 according to the invention, the contact force $F_A$ of a conventional dual clutch is depicted, which has an essentially linear progression of the contact force $F_A$ in the third phase, whereby, for example, in the case of wear, $V_2$ to $V_1$, a substantial decrease of the contact force $F_A$ occurs.

REFERENCE LABELS 10 dual clutch
12 first friction clutch
14 second friction clutch
16 first clutch plate
18 first contact plate
20 first counter plate
22 first actuating element
24 second clutch plate
26 second contact plate
28 second counter plate
30 second actuating element
32 lever spring tongue
33 arch
34 spring element
35 fastening element
36 thrust ring
37 bulge
38 threaded connection
39 holding clips
40 groove 41 cutout
42 clutch cover
44 wire support ring
46 bolt
$F_N$ contact force
$F_E$ engaging force
$F_A$ contact force
$V_1$ wear zone end
$V_2$ wear zone start, minimum engagement travel
$V_3$ maximum engagement travel

The invention claimed is:

1. A dual clutch for coupling a drive shaft of an engine of a motor vehicle with a transmission shaft of a motor vehicle transmission and an auxiliary power take-off of the motor vehicle, comprising:
   a first friction clutch for frictionally pressing a first clutch plate which is couplable with the transmission shaft between a first contact plate and a first counter plate, where the first contact plate is movable in an axial direction to engage the first friction clutch,
   a second friction clutch for frictionally pressing a second clutch plate which is couplable with the auxiliary power take-off between a second contact plate and a second counter plate, where the second contact plate is movable in the axial direction to engage the second friction clutch,
   a first actuating element for moving the first contact plate,
   a second actuating element for moving the second contact plate, the second actuating element being a lever spring with a plurality of lever spring tongues directed radially inward, each of the spring tongues having an arch, wherein the second contact plate is connected to a thrust ring which is operationally connected to the second actuating element to transmit the displacement motion, and
   at least one spring element having a radially outer end and a radially inner end with a fastening element connected to the at least one spring element between the radially outer end and the radially inner end, the at least one spring element being held onto one of the lever spring tongues by the fastening element such that the radially inner end and the radially outer end of the at least one spring element contact the one of the lever spring tongues, an axial gap is present between the arch and at least a portion of the at least one spring element between the radially outer end and the radial inner end, and a pre-stressing force is applied to the second actuating element, the at least one spring element being situated between the second actuating element and the thrust ring.

2. The dual clutch according to claim 1, wherein each of the lever spring tongues has a respective one of the at least one spring element situated thereon.

3. The dual clutch according to claim 1, wherein the fastening element is configured in the form of a clip connection with at least two holding clips.

4. The dual clutch according to claim 1, wherein the at least one spring element has a cutout for resting on a bulge of the thrust ring.

5. The dual clutch according to claim 1, wherein the at least one spring element is configured so that an engagement process of the second friction clutch includes a first phase, in which free play is surmounted, a second phase, which exhibits a second phase rise in contact force per engagement travel unit as the engagement travel increases, and a third phase, which exhibits a third phase rise in contact force per engagement travel unit as the engagement travel increases, the third phase rise being smaller than the second phase rise.

6. The dual clutch according to claim 5, wherein the third phase begins essentially upon surpassing the pre-stressing force on the second actuating element.

* * * * *